United States Patent [19]

Aoki et al.

[11] Patent Number: 4,668,908
[45] Date of Patent: May 26, 1987

[54] POWER CONTROL SYSTEM FOR ELECTRICAL APPARATUS

[75] Inventors: Kazuhisa Aoki; Hiroyuki Tagishi; Nobuteru Maekawa, all of Kadoma, Japan

[73] Assignee: Matsushita Electric Works, Ltd., Japan

[21] Appl. No.: 847,294

[22] Filed: Apr. 2, 1986

[30] Foreign Application Priority Data

Apr. 12, 1985 [JP] Japan .................................. 60-78113

[51] Int. Cl.[4] ............................................ G05F 1/455
[52] U.S. Cl. .................................... 323/324; 323/239; 323/267
[58] Field of Search ............... 323/239, 242, 267, 324, 323/326, 901, 908

[56] References Cited

U.S. PATENT DOCUMENTS 4,205,782 6/1980 Cannella ........................ 307/252 B

FOREIGN PATENT DOCUMENTS 14223 1/1983 Japan .................................. 323/239

Primary Examiner—Peter S. Wong
Assistant Examiner—Judson H. Jones
Attorney, Agent, or Firm—Stevens, Davis, Miller & Mosher

[57] ABSTRACT

A power control system for electrical apparatus, in which a unidirectional rectifying device is connected to one of a plurality of loads connected mutually in parallel, an ignition circuit comprising a plurality of resistors is connected between the loads and a switching element whose conduction phase is controllable, and at least one of the resistors in the ignition circuit is connected through the unidirectional rectifying device to the said load, whereby the power supply to each of the plurality of loads can be controlled in an individual manner by means of the single switching element.

8 Claims, 35 Drawing Figures

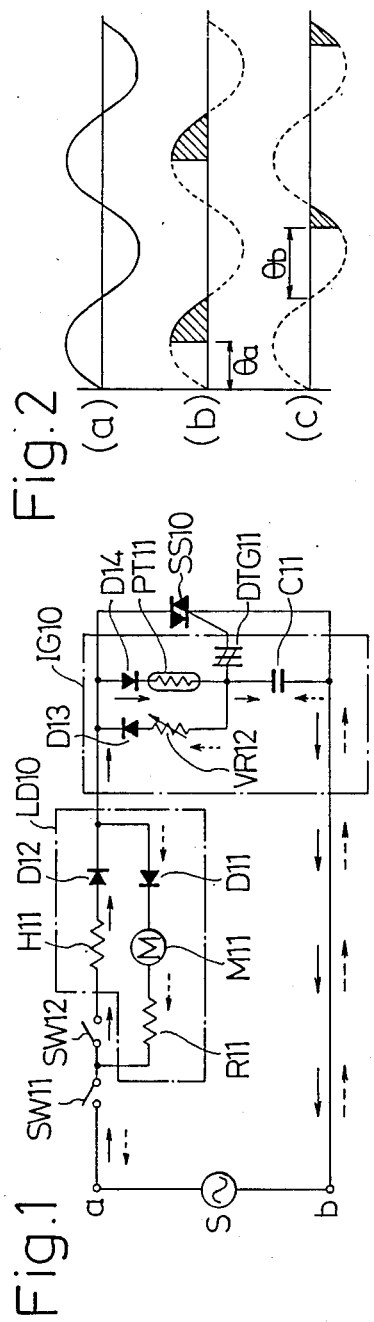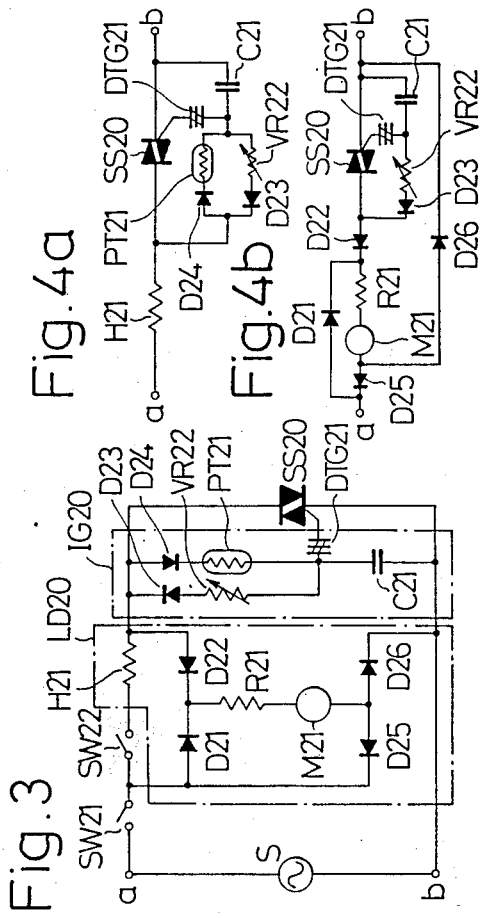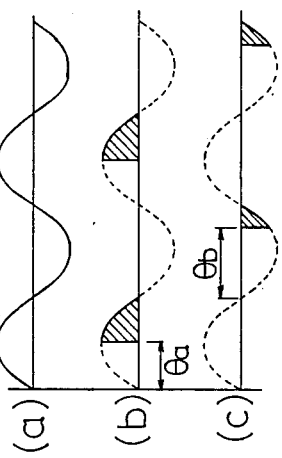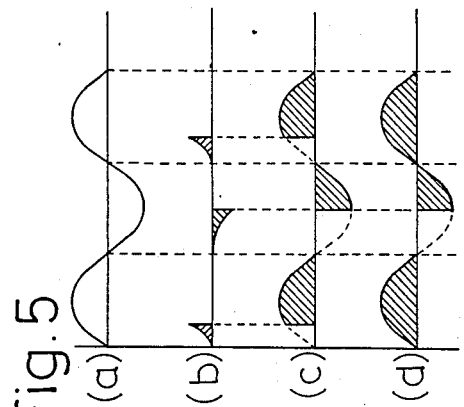

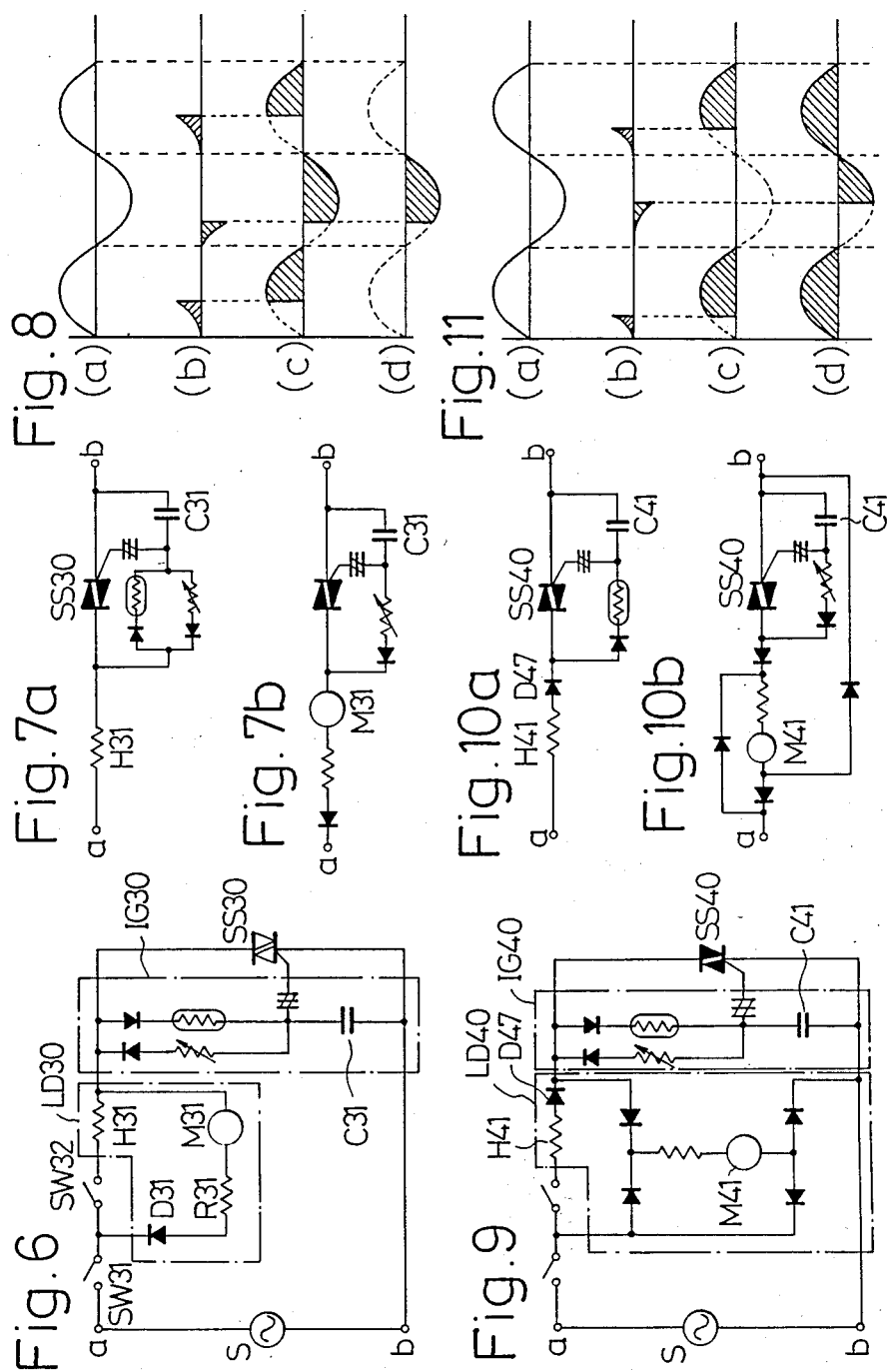

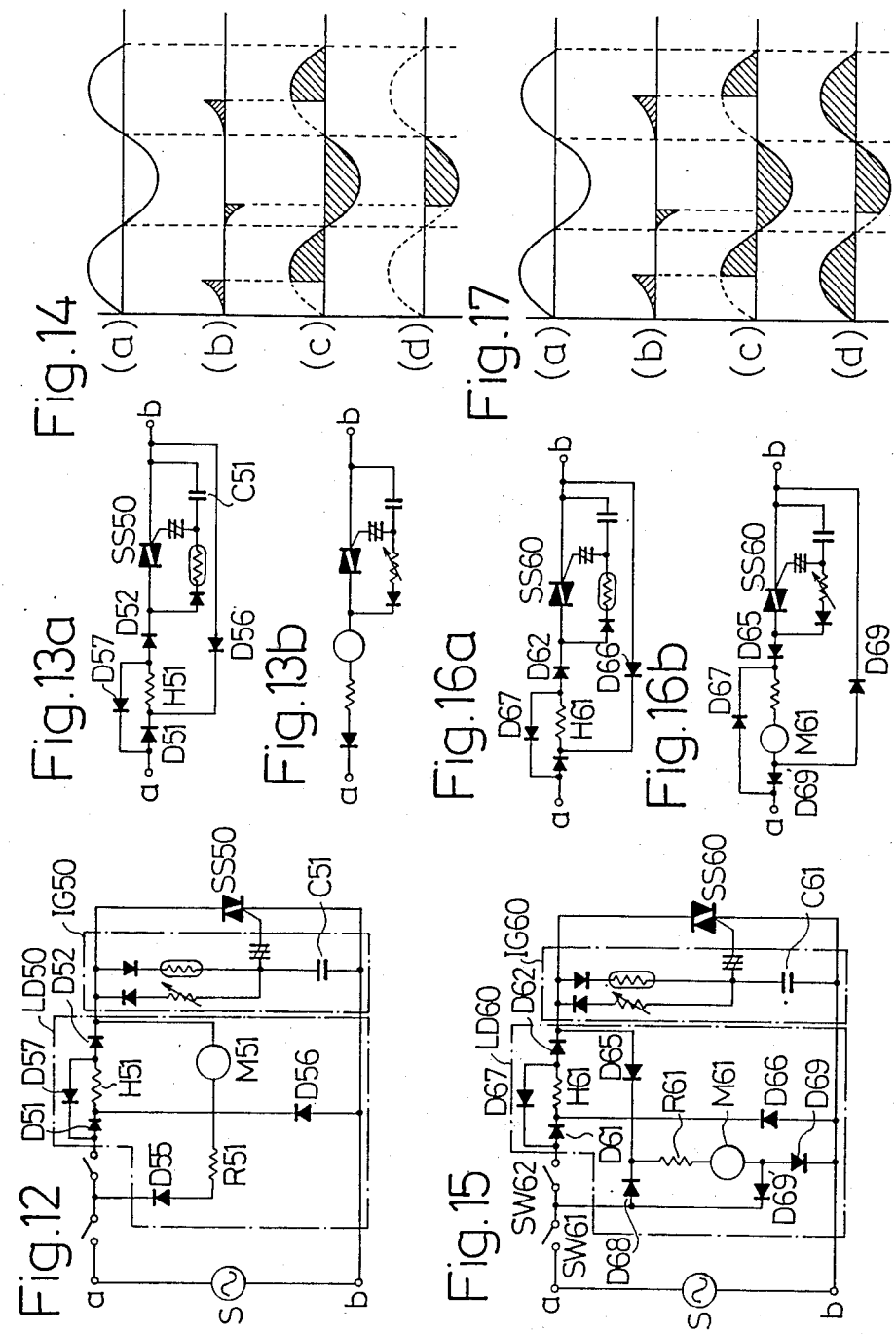

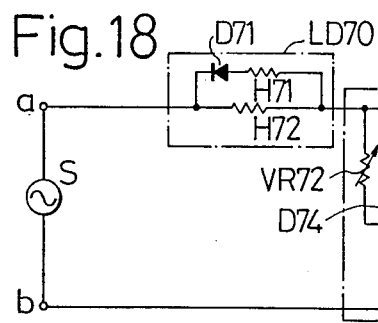
Fig. 18
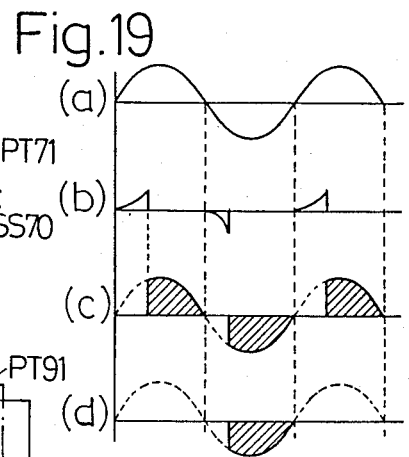
Fig. 19
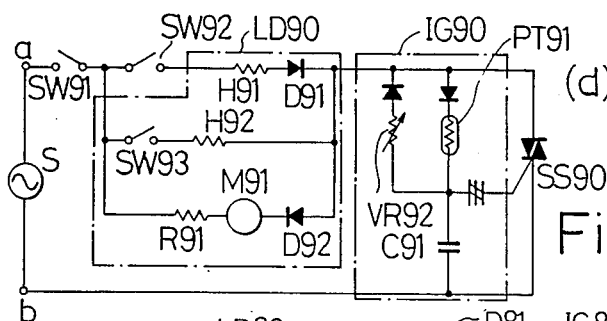
Fig. 22
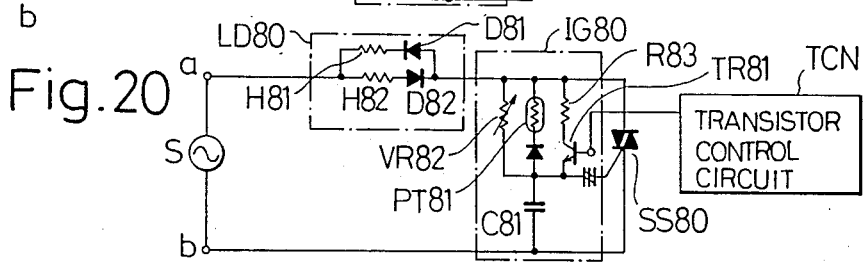
Fig. 20
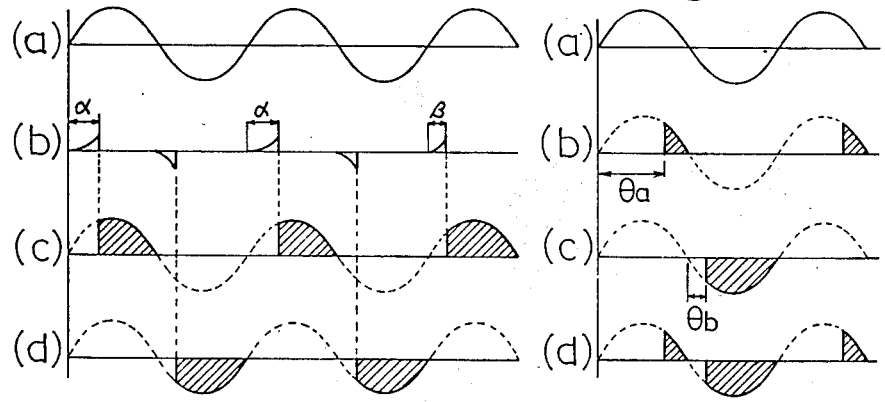
Fig. 21
Fig. 23

POWER CONTROL SYSTEM FOR ELECTRICAL APPARATUS

TECHNICAL BACKGROUND OF THE INVENTION

The present invention relates to power control systems for electrical apparatuses and, more particularly, to a power control system having a simple control circuit and effectively applicable to an electrical apparatus having two or more loads.

The power control system of the kind referred to is useful as being utilizable in such electrical apparatuses and the like having two or more loads as hair dryers, constant-temperature and constant-humidity storages, illuminations and so on, with component parts of the system commonly used for the respective loads.

DISCLOSURE OF PRIOR ART

Various power control systems for electrical apparatuses have been so far proposed, an exemplary one of which will be a heater-temperature control system disclosed in U.S. Pat. No. 4,205,782 to Joseph L. Cannella, which comprises a power supply circuit including a transformer and connected to a plurality of heaters connected in parallel. In this case, a control circuit including a TRIAC is inserted on a secondary winding side of the transformer connected to the plurality of heaters in the power supply circuit, so that a regulation of mainly a variable resistor in the control circuit will cause the triggering angle of the TRIAC to be controlled through a pair of DIACs connected to a control end of the TRIAC to thereby control the temperature of the heaters.

According to this U.S. Patent, it will be possible to simultaneously control a plurality of such parallelly connected loads as the heaters which are substantially homogeneous with each other. In the case of such electrical apparatus as hair dryers, on the other hand, there are provided two or more of such heterogeneous loads as a fan-driving motor and a heater, which require respectively an individual power control according to the property of each load. Accordingly, with such known power control system of the U.S. Patent, there has been a problem that the system requires the same number of the control circuits as the loads, resulting in a higher cost and a larger space of occupation.

TECHNICAL FIELD OF THE INVENTION

A primary object of the present invention is, therefore, to provide a power control system for electrical apparatus, the system being capable of using component parts commonly to respective two or more heterogeneous loads, controlling the supplied power to the respective loads independently of each other, and effectively minimizing required cost and size.

According to the present invention, this object is realized by providing a power control system which comprises a load circuit including a plurality of loads connected mutually in parallel and a unidirectional rectifying device connected in series with at least one of the loads, an ignition circuit including a plurality of resistors connected mutually in parallel, at least one of which resistors being connected to the unidirectional rectifying device in the load circuit, and a switching element connected to an AC source and the load circuit and controlled in the conduction phase through the ignition circuit.

Other objects and advantages of the present invention shall become clear from the following description of the invention detailed with reference to preferred embodiments shown in accompanying drawings.

BRIEF EXPLANATION OF THE DRAWINGS

FIG. 1 is a circuit diagram of a first embodiment of the power control system for electrical apparatus according to the present invention;

FIG. 2 is a diagram of voltage waveforms in the circuit of FIG. 1 for explanation of its operation;

FIG. 3 is a circuit diagram of a second embodiment of the present invention;

FIGS. 4a and 4b show current path circuits corresponding to different operational states of the circuit of FIG. 3;

FIG. 5 is a diagram of voltage waveforms in the circuit of FIG. 3 for explanation of its operation;

FIG. 6 is a circuit diagram of a third embodiment of the present invention;

FIGS. 7a and 7b show current path circuits corresponding to different operational states of the circuit of FIG. 6;

FIG. 8 is a diagram of voltage waveforms in the circuit of FIG. 6, for explanation of its operation;

FIG. 9 is a circuit diagram of a fourth embodiment of the present invention;

FIGS. 10a and 10b show current path circuits corresponding to different operational states of the circuit of FIG. 9;

FIG. 11 is a diagram of voltage waveforms in the circuit of FIG. 9 for explanation of its operation;

FIG. 12 is a circuit diagram of a fifth embodiment of the present invention;

FIGS. 13a and 13b show current path circuits corresponding to different operational states of the circuit of FIG. 12;

FIG. 14 is a diagram of voltage waveforms in the circuit of FIG. 12 for explanation of its operation;

FIG. 15 is a circuit diagram of a sixth embodiment of the present invention;

FIGS. 16a and 16b show current path circuits corresponding to different operational states of the circuit of FIG. 15;

FIG. 17 is a diagram of voltage waveforms in the circuit of FIG. 15 for explanation of its operation; FIG. 18 is a circuit diagram of a seventh embodiment of the present invention; FIG. 19 is a diagram of voltage waveforms in the circuit of FIG. 18;

FIG. 20 is a circuit diagram of an eighth embodiment of the present invention;

FIG. 21 is a diagram of voltage waveforms in the circuit of FIG. 20;

FIG. 22 is a circuit diagram of a ninth embodiment of the present invention;

FIG. 23 is a diagram of voltage waveforms in the circuit of FIG. 22;

DISCLOSURE OF PREFERRED EMBODIMENTS

Figure 24:
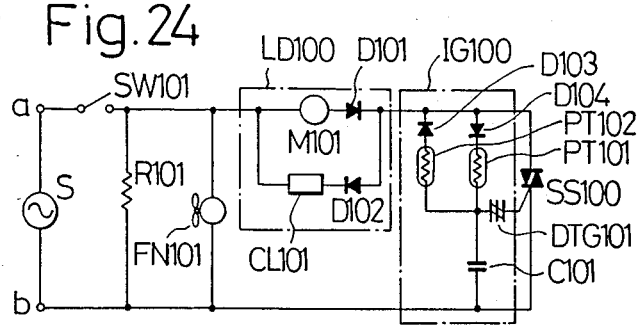
FIG. 24 is a circuit diagram of a tenth embodiment of the present invention.

Referring to FIG. 1, there is shown a first embodiment of the power control system, in which such a load circuit LD10 as incorporated in a hair dryer and an ignition circuit IG10 for controlling the triggering phase of such a switching element SS10 as TRIAC are connected to an AC power source S, and the load circuit LD10 includes such heterogeneous loads as a fan motor M11 for generation of air stream within the hair dryer and a heater H11 for heating the air stream. In the illustrated embodiment, the motor M11 is connected to one end "a" of the power source S through a first switch SW11 and a resistor R11, while the heater H11 is connected to the same end "a" through the first switch SW11 and a second switch SW12 so as to be in parallel to the motor M11. The motor M11 and the heater H11 are connected commonly to one end of each of the ignition circuit IG10 and switching element SS10 respectively through each of such rectifying devices D11 and D12 as diodes which are parallel and allow currents to flow mutually in opposite directions.

The trigger circuit IG10 comprises such rectifying devices D13 and D14 as diodes which are parallel and allow currents to flow mutually in opposite directions, and these rectifying devices D13 and D14 are connected respectively to a variable resistor VR12 and a PTC thermistor PT11 which are connected in common to one end of such a trigger element DTG11 as DIAC and also to one end of a capacitor C11. The trigger element DTG11 is connected at the other end to a control end of the switching element SS10 connected in parallel to the ignition circuit IG10, whereas the switching element SS10 and capacitor C11 are connected at the other ends commonly to the other end "b" of the power source S.

When, in the power control system of FIG. 1, the first switches SW11 and SW12 are at their closed positions and during half cycle of the source voltage positive at the one source end "a", a small current flows through a route shown by solid-line arrows from the source end "a" through the first and second switches SW11 and SW12, heater H11, rectifying devices D12 and D14, PTC thermistor PT11 and capacitor C11 to the other source end "b", upon which a voltage at a junction between the PTC thermistor PT11 and capacitor C11 causes the switching element SS10 to be triggered through the trigger element DTG11, whereby a large current is caused to flow from the source end "a" through the first and second switches SW11 and SW12, heater H11, recitifying device D12 and switching element SS10 to the other source end "b" so as to supply a sufficient amount of current to the heater H11. During another half cycle of the source voltage negative at the source end "a", on the other hand, a small current flows through a route shown by dotted-line arrows from the other source end "b" through the capacitor C11, variable resistor VR12, rectifier D11, motor M11, resistor R11 and first switch SW11 to the source end "a", upon which a voltage at the junction between the capacitor C11 and variable resistor VR12 causes the switching element SS10 to be triggered through the trigger element DTG11, whereby a large current is made to flow from the other source end "b" through the switching element SS10, rectifier D11, motor M11, resistor R11 and first switch SW11 to the source end "a" to have a sufficient amount of current fed to the motor M11.

Referring more in details to the above with reference also to FIG. 2, an application of such a voltage of the AC power source S as (a) in FIG. 2 to the load circuit LD10 and ignition circuit IG10 causes the triggering angle $\Theta a$ of the voltage to the heater H11 during a half cycle to be determined only by the PTC thermistor PT11 as in (b) of FIG. 2, and the triggering angle $\Theta b$ of the voltage to the motor M11 during another half cycle to be determined only by the variable resistor VR12 as in (c) of FIG. 2. Therefore, the power control can be effected individually for each of the two heterogeneous loads in the load circuit LD10 which are the motor M11 and heater H11 only by means of the single switching element SS10 so that, with respect to the motor M11, a proper regulation of the variable resistor VR12 will allow the motor to provide a desired fan speed and eventually a desired amount of air stream discharged from the hair dryer and, with respect to the heater H11, a fixed amount of heat can be provided to the air stream for rendering the temperature of the air discharged from the hair dryer to be constant. Thus, it will be appreciated that the ignition circuit IG10 and switching element SS10 are arranged for use in common to the load circuit LD10 including the two hetergeneous loads.

Referring to FIG. 3, there is shown a second embodiment of the present invention, wherein an ignition circuit IG20 and a switching element SS20 are the same as those in the first embodiment but a load circuit LD20 is different from that of the first embodiment. More particularly, a heater H21 in the load circuit LD20 is connected at one end through first and second switches SW21 and SW22 to the one end "a" of the power source S and at the other end directly to the load circuit LD20 and switching element SS20. On the other hand, a motor M21 is connected at one end through a resistor R21 to a junction between the cathods of a pair of rectifying devices D21 and D22 connected at their anodes respectively to a junction between the first and second switches SW21 and SW22 and to a junction between the heater H21 and the ignition circuit IG20, while the motor M21 is connected at the other end to a junction between the anodes of a pair of rectifying devices D25 and D26 connected at their cathode respectively to the anode of the rectifying device D21 and to a common junction between the other power source end "b", ignition circuit IG20 and switching element SS20.

Referring also to FIGS. 4 and 5, an application of such a voltage of the power source S as (a) of FIG. 5 to the load circuit LD20 and ignition circuit IG20 causes a terminal voltage of a capacitor C21 to vary as in (b) of FIG. 5. In the circumstances, the triggering angle of the switching element SS20 is controlled, as will be clear in view specifically of FIG. 4a, by a PTC thermistor PT21 during half cycles of the voltage positive at the one source end "a", and by a variable resistor VR22 during other half cycles of the voltage negative at the source end "a", respectively, so that the heater H21 will receive such a voltage as (c) of FIG. 5 as a power supplied. Also during the half cycles of the voltage positive at the source end "a", as will be clear in view specifically of FIG. 4b, the motor M21 receives a large current through the rectifying device D21, resistor R21, motor M21, rectifying device D26 and the other source end "b" without being subjected to the trigger control of the switching element SS20, and, also during the other half cycles of the voltage negative at the source end "a", the power supply to the motor M21 is made with the triggering angle of the switching element SS20 controlled by the variable resistor VR22, so that such a voltage having a waveform as (d) of FIG. 5 will be continuously applied to the motor M21.

Accordingly, the embodiment of FIG. 3 as applied to the hair dryer as an example makes it possible that, with the triggering angle of the switching element SS20 enlarged during negative half cycles of the power source voltage, the power supply amount to the motor M21 is reduced to lower the discharged amount of air stream for optimumly stabilizing the temperature of the air stream. In particular, this operation can be performed favorably within the range of the temperature characteristic of the PTC thermistor PT21, and the present embodiment can achieve a more accurate temperature control than in the case of the embodiment of FIG. 1.

Referring now to FIG. 6 of a third embodiment of the present invention, a load circuit LD30 is also modified. That is, a heater H31 in the load circuit LD30 is connected at one end to the one end "a" of the power source S through first and second switches SW31 and SW32 and at the other end directly to an ignition circuit IG30 and a switching element SS30, while a motor M31 is connected at one end to a junction between the first and second switches SW31 and SW32 through a rectifying device D31 reverse directional with respect to the one source end "a" and through a resistor R31, and at the other end directly to a junction between the heater H31 and the ignition circuit IG30.

Referring also to FIGS. 7 and 8, the application of such voltage of the power source S as (a) of FIG. 8 to the load circuit LD30 and ignition circuit IG30 causes a capacitor C31 to have such a terminal voltage as (b) of FIG. 8, whereby the heater H31 is made to receive a voltage such as (c) of FIG. 8 (c) so that a current flows through a path shown in FIG. 7a, whereas the motor M31 is made to receive a voltage as (d) of FIG. 8 so that a current flows through a path shown in FIG. 7b. As a result, in contrast to the second embodiment of FIG. 3, the energization of the motor M31 can be prevented during the half cycles of the voltage positive at the one source end "a" as seen specifically in (d) of FIG. 8.

Referring now to FIGS. 9 to 11 of a fourth embodiment, the system has an arrangement similar to that of the second embodiment of FIG. 3 only except that a rectifying device D47 is inserted between a heater H41 and an ignition circuit IG40. An operational difference of the present instance from the second embodiment is that the energization of the heater H41 is prevented during the half cycles of the voltage negative at the one source end "a" as will be seen specifically in (c) of FIG. 11.

Referring to FIGS. 12 to 14 of a fifth embodiment of the present invention which has an arrangement similar to that of the third embodiment of FIG. 6, the system is modified from the third embodiment in such that rectifying devices D51 and D52 of normal direction with respect to the one end "a" of the power source S are connected to both ends of a heater H51, and another rectifying device D56 is connected at the cathode to a junction between the rectifying device D51 and the heater H51 and at the anode to a junction between the other source end "b" and an ignition circuit IG50, the rectifying device D51 being connected at the anode to the cathode of still another rectifying device D57 having the anode connected to a junction between the heater H51 and the rectifying device D52. An operational difference of the present embodiment from the third embodiment is that the heater H51 is energized fully during the half cycles of the voltage negative at the one source end "a", with the triggering angle of a switching element SS50 not controlled as seen in FIG. 13a and in (c) of FIG. 14.

Referring to FIGS. 15 to 17, a sixth embodiment of the present invention is of an arrangement similar to that of the fifth embodiment of FIG. 12 but different therefrom in that a motor M61 is connected at one end through a resistor R61 to a junction between the cathodes mutually connected of a pair of rectifying devices D65 and D68 connected at their anodes respectively to a junction between first and second switches SW61 and SW62 and to a junction between a rectifying device D62 and an ignition circuit IG60. The motor M61 is connected at the other end to a junction between the anodes mutually connected of a pair of rectifying devices D69 and D69' respectively connected at the cathode to a junction between the other source end "b" and the ignition circuit IG60 and to the anode of the rectifying device D68. In the present embodiment, in contrast to the fifth embodiment, the motor M61 is energized fully during the half cycles of the voltage positive at the source end "a" without being affected by the triggering control of a switching element SS60, as seen in FIG. 16b and in (d) of FIG. 17.

Referring to FIGS. 18 and 19, there is shown a seventh embodiment of the present invention, wherein a load circuit LD70 comprises a pair of heaters H71 and H72 connected in parallel to each other, and a rectifying device D71 connected to be reverse directional with respect to the one end "a" of the power source S so that, in the present embodiment, the triggering of a switching element SS70 will take place during the half cycles of the voltage positive at the source end "a" due to a current flowing through the heater H72, variable resistor VR72 and capacitor C71 to the other end "b" of the power source S, and also during the other half cycles of the voltage negative at the source end "a" due to a current flowing through the capacitor C71, a series connection of rectifying device D74 and PTC thermistor PT71 (or through the variable resistor VR72) and the parallel circuit of the heaters H71 and H72 to the one source end "a". Consequently, the triggering angle of the switching element SS70 is determined only by the variable resistor VR72 during the half cycles of the voltage positive at the source end "a", or by a composite resistance of the variable resistor VR72 and PTC thermistor PT71 during the half cycles of the voltage negative at the source end "a", whereby the heaters H71 and H72 can be controlled under different conditions, as will be clear in view of (c) and (d) of FIG. 19.

Referring to FIGS. 20 and 21 showing an eighth embodiment of the present invention, a load circuit LD80 comprises in this case a parallel circuit of heaters H81 and H82 which are connected through mutually parallel and reverse directional rectifying devices D81 and D82 to an ignition circuit IG80, while the ignition circuit IG80 comprises a transistor TR81 connected, together with a collector-side resistor R83, in parallel to a variable resistor VR82 and a PTC thermistor PT81 and controlled by a transistor control circuit TCN. While the transistor TR81 is in OFF state as controlled by the control circuit TCN, the triggering angle of a switching element SS80 is determined only by the variable resistor VR81 during the half cycles of the voltage positive at one end "a" of the power source S and by a composite resistance of the variable resistor VR72 and PTC thermistor PT71 during the other half cycles negative at the source end "a". When the transistor TR81 is turned ON, on the other hand, the triggering angle of the switching element SS80 is determined by a composite resistance of the variable resistor VR81 and resistor R83 during the half cycles positive at the source end "a", so that, as seen from (b) and (c) of FIG. 21, the triggering angle of the switching element SS80 can be made to be $\beta$ smaller than $\alpha$ in the OFF state of the transistor TR81. This is effective in supplying a relatively large current to one of the heaters as a starting current.

Referring to FIGS. 22 and 23, there is shown a ninth embodiment of the present invention, which has an arrangement similar to that of the first embodiment of FIG. 1, except that a second heater H92 is connected in parallel to a first heater H91 and a motor M91 with a switch SW93 interposed, so that such currents as shown in (b), (c) and (d) of FIG. 23 will flow respectively through each of the heater H91, motor M91 and heater H92, whereby the three different loads can be properly controlled respectively individually, depending on their different conditions.

Figure 25:
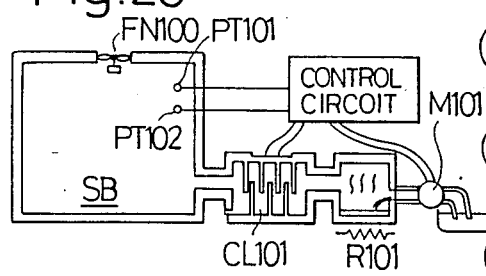
FIG. 25 is a diagram for showing a mechanical arrangement of the embodiment of FIG. 24.
Figure 26:
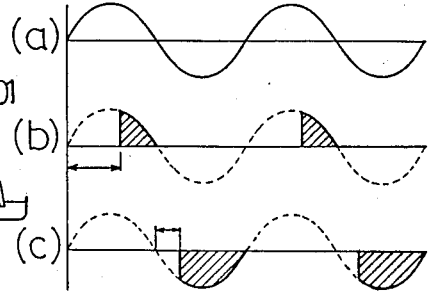
FIG. 26 is a diagram of voltage waveforms in the circuit of FIG. 24.

Referring to FIGS. 24 to 26 showing a tenth embodiment of the present invention which is applied to a constant-temperature and constant-humidity storage, a humidifying heater R101 and a fan motor FN101 are connected in parallel to the power source S through a switch SW101 so as to be kept driven so long as the switch SW101 is closed. At the subsequent stage of the fan motor FN101, there are connected a load circuit LD100 including loads to be controlled, an ignition circuit IG100 and a switching element SS100. The load circuit LD100 comprises a parallel circuit of a pump motor M101 for supplying water to a humidifier and a cooling element CL101 such as a Peltier effect element, and the pump motor M101 and cooling element CL101 are connected to the ignition circuit IG100 and switching element SS100 respectively through each of rectifying devices D101 and D102 which are opposite directional to each other. The ignition circuit IG100 is of an arrangement similar to that of the first embodiment, except that a humidity sensor PT102 is used in place of the variable resistor. As will be clear from FIG. 25, a PTC thermistor PT101 acting as a temperature detector and the humidity sensor PT102 in the control system of the present invention are mounted at proper positions within a constant-temperature and constant-humidity storage SB. According to the present embodiment, as will be clear with reference to FIG. 26 in view of FIG. 2, a two-load control similar to that of the first embodiment can be realized, except for differences in the triggering angles $\Theta a$ and $\Theta b$ of the switching element SS100.

Figure 27:
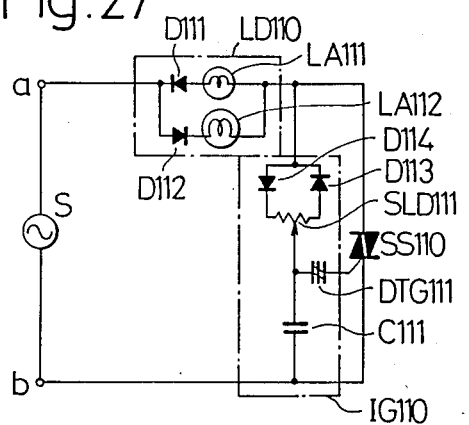
FIG. 27 is a circuit diagram of an eleventh embodiment of the present invention.
Figure 28:
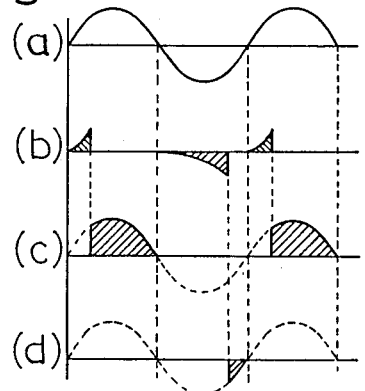
FIG. 28 is a diagram of voltage waveforms in the circuit of FIG. 27.

Referring to FIGS. 27 and 28 showing an eleventh embodiment of the present invention as an example of application to a sort of illuminations, there is connected to one end "a" of the power source S a load circuit LD110 which comprises a parallel connection of two different lamps LA111 and LA112 connected respectively through each of parallel and opposite directional rectifying devices D111 and D112 to the source end "a". An ignition circuit IG110 inserted between the load circuit LD110 and a switching element SS110 comprises a pair of parallel and opposite directional rectifying devices D113 and D114, and such a variable resistor SLD111 as a potentiometer connected across the devices D113 and D114 and providing two resistances inversely proportional to each other with a displacement of its sliding arm which is connected to one end of a capacitor C111 and also to one end of a trigger element DTG111. With such arrangement, as will be clear by reference to FIG. 28 in view of FIG. 2, the present embodiment can realize a two-load control similar to that of the first embodiment, except for differences in the triggering angles of the switching element SS110.

The present invention allows various design modifications. Just as an example, such two or three loads as have been disclosed to be controlled in the respective embodiments may easily be increased to be four or more to be respectively individually controlled with a readily adapted arrangement thereto.

Figure 29:
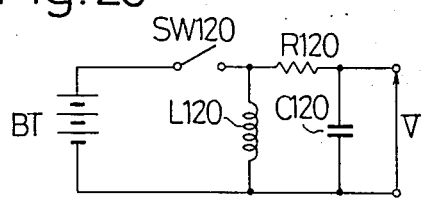
FIG. 29 is a power supply circuit for operating the power control system according to the present invention with a DC power source.
Figure 30:
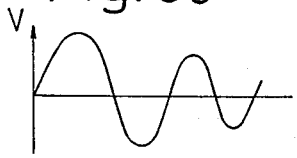
FIG. 30 shows waveform of an output of the circuit in FIG. 29. While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

While the AC power source only has been referred to as an example in the foregoing embodiments, it is possible to employ such a vibration circuit as shown in FIG. 29, as so arranged that a DC power source BT such as a battery is connected through a switch SW120 to a parallel circuit of an inductance L120 and a capacitor C120 with a resistor R120 interposed, to generate such an alternating output voltage as shown in FIG. 30 for applying to the control circuit in the respective embodiments.

What is claimed as our invention is:

1. A power control system for an electrical apparatus comprising a load circuit including a plurality of loads connected mutually in parallel and at least one unidirectional rectifying device connected in series with at least one of said loads, an ignition circuit including a plurality of resistors connected mutually in parallel, at least one of said resistors being connected to said unidirectional rectifying device in said load circuit, and a switching element connected to an AC circuit and said load circuit and controlled in the conduction phase through said ignition circuit.

2. A power control system according to claim 1, wherein said plurality of loads in said load circuit are two and are incorporated in a hair dryer, one of said loads being a heater and the other being a fan-driving motor.

3. A power control system according to claim 1, wherein said plurality of loads in said load circuit are two, said rectifying device in said load circuit is also provided to be two which are respectively opposite directionally connected to each of said two loads, said plurality of resistors in said ignition circuit are also provided to be two, and said ignition circuit further comprises two rectifying devices connected respectively opposite directionally to each of said resistors.

4. A power control system according to claim 3, wherein one of said resistors in said ignition circuit is a variable resistor and the other is a PTC thermistor.

5. A power control system according to claim 1, wherein said ignition circuit further comprises a transistor connected in parallel to said plurality of resistors to be turned ON and OFF by an external input to the ignition circuit.

6. A power control system according to claim 1, wherein said plurality of loads in said load circuit are two incorporated in a constant-temperature and constant-humidity storage, one of said two loads being a pump motor for driving a humidifier and the other being a cooling element for said storage.

7. A power control system according to claim 6, wherein said ignition circuit further comprises two resistors, one of which resistors being a temperature sensor and the other being a humidity sensor.

8. A power control system according to claim 1, wherein said plurality of loads in said load circuit are two lamps, and said resistors in said ignition circuit are variable to be mutually inversely proportional.

* * * * *